United States Patent [19]

Vigne

[11] Patent Number: 5,727,717
[45] Date of Patent: Mar. 17, 1998

[54] MAGNETICALLY COUPLED JOINTS FOR MANNEQUINS AND FORMS

[76] Inventor: Patrick Vigne, 92 Fentiman Road, London, United Kingdom

[21] Appl. No.: 507,031

[22] Filed: Jul. 31, 1995

Related U.S. Application Data

[63] Continuation of Ser. No. 182,142, Jan. 14, 1994, abandoned.

[30] Foreign Application Priority Data

Jul. 16, 1991 [GB] United Kingdom ............ 9115415
Apr. 21, 1992 [GB] United Kingdom ............ 9208592

[51] Int. Cl.⁶ ............................................. D06C 15/00
[52] U.S. Cl. ............................................. 223/66; 403/DIG. 1
[58] Field of Search ........................... 223/66, 68, 52; 403/DIG. 1; 446/139, 137, 129

[56] References Cited

U.S. PATENT DOCUMENTS

| | | | |
|---|---|---|---|
| 2,081,071 | 5/1937 | Scovil et al. | 223/68 |
| 2,595,485 | 5/1952 | Roman | 24/221 |
| 3,028,058 | 4/1962 | Wolf | 223/68 |
| 3,140,712 | 7/1964 | Hunter | 446/129 |
| 3,168,227 | 2/1965 | Osmond | 223/66 |
| 3,246,422 | 4/1966 | Teagarden | 223/66 |
| 3,464,146 | 9/1969 | McCurdy | 446/139 |
| 4,038,775 | 8/1977 | Sato | 46/22 |
| 4,609,325 | 9/1986 | Gabrielli | 403/DIG. 1 |
| 5,112,265 | 5/1992 | Naum | 446/384 |
| 5,277,643 | 1/1994 | Ejima | 446/139 |

FOREIGN PATENT DOCUMENTS 1101502   5/1954   France ............................ 223/66

*Primary Examiner*—Bibhu Mohanty
*Attorney, Agent, or Firm*—Michael Y. Epstein

[57] ABSTRACT

There is disclosed a mannequin or form for displaying clothes accessories or other articles, comprising at least two parts which are separable at a respective joint to allow the mannequin or form to be dressed, the or each joint comprising a joint-surface on each part, at least part of which joint-surfaces engage each other when the joint is assembled, magnetic material being contained in or behind both of the joint-surfaces, the magnetic material in at least one of the parts comprising, or being magnetised by, a permanent magnet sufficient to hold the joint together in use. This arrangement is much simpler to assemble than the prior art arrangements. The two parts of the joint merely need to be brought into proximity and magnetic forces then draw them together. There is no necessity to rotate one part relative to the other, with a resultant reduction in the likelihood of damage to the clothes.

19 Claims, 6 Drawing Sheets

MAGNETICALLY COUPLED JOINTS FOR MANNEQUINS AND FORMS

This is a continuation of application Ser. No. 08/182,142 filed on Jan. 14, 1994 abandoned.

This invention relates to joints.

The background of the invention will be explained with reference to mannequins and forms, although as will appear, in one aspect the invention has other applications. Mannequins, sometimes called "dummies" or "display dummies", are models of complete human bodies, often stylised, which are used to display clothes accessories or other articles, and are usually life-sized, although exceptionally may not be. Forms are models of parts of the human body, again often stylised. Forms are also used to display clothes accessories or other articles and, again are usually life-sized, although exceptionally may not be. A form may thus consist of a lower torso and two legs, or a torso, or a torso with one or more arms and so on.

Unless the limbs are conveniently placed for the purpose, it is usually necessary to make the mannequin or form in two or more parts to allow it to be dressed. For example, it is not possible to dress a mannequin or form's legs in a pair of tights or trousers unless the feet are fairly close together. If the feet are too far apart, the legs cannot be dressed in trousers unless one or part of one leg is removable. Arms are usually detachable and the torso is usually made in two parts for similar reasons. Hands may have to be detached from arms in order to allow the arm to pass through a sleeve.

A conventional way of securing a leg, say, to a torso is with a bayonet-type fitting which is sometimes referred to as an "LT fitting". A projection from the leg terminates in a cross-piece forming a T-shape. To assemble the leg on the torso, the cross-piece has to be aligned with and inserted into a corresponding slot in a plate on the torso. Once that is done the leg is rotated about the projection so that the cross-piece is behind the plate and cannot be withdrawn through the slot.

The conventional arrangement is very inconvenient to assemble since the insertion of the cross-piece in its slot and the rotation of, say, the leg relative to the torso, must be performed after the leg has been dressed. In addition to the inconvenience, there is a likelihood of the clothes becoming trapped in the joint which damages those made from delicate materials, eg tights.

Against this background, in accordance with one aspect of the invention, there is provided a mannequin or form for displaying clothes accessories or other articles, comprising at least two parts which are separable at a respective joint to allow the mannequin or form to be dressed, the or each joint comprising a joint-surface on each part, at least parts of which joint-surfaces engage each other when the joint is assembled, magnetic material being contained in or behind both of the joint-surfaces, the magnetic material in at least one of the parts comprising, or being magnetised by, a permanent magnet sufficient to hold the joint together in use, the joint-surfaces being shaped to interfit so as to define one or more relative positions in which the parts can be located when the joint is assembled and from which the parts cannot be moved without dissembling the joint at least partly.

The arrangement allows the two parts to be drawn together by magnetic forces when brought into proximity. It may be necessary to get the male member partly into the socket, or at least generally aligned therewith, but the process is much less exacting than trying to align the T-shaped projection of the traditional LT fitting, with the slot which is to receive it. Because the parts are located by the mating male and female members, there is much greater tolerance in the positioning of the magnetic materials than there is in the location of the parts of the traditional LT fitting. This saves considerably in the cost of manufacture, for example, since it takes less time to locate the magnetic parts than it does to locate the parts of the LT fitting. Further, inaccuracies in location of the parts of an LT fitting, will produce a step at the outside surface edge of the joint which will require a finishing step to shape the exterior of the joint to correct.

There is no necessity to rotate one part relative to the other, with a resultant reduction in the likelihood of damage to the clothes. Indeed, in some cases it is an advantage if the clothes are trapped. For example, if tights become trapped between the two parts of the joint it conveniently takes up what would otherwise appear as bagginess which would have to be removed by careful arrangement of the clothes at the joint. The joint is also much easier to dissemble, which has a further advantage compared with the traditional LT fitting. The traditional fitting must be rotated until the (hidden) cross piece is aligned with the (hidden) slot before the joint can be dissembled. This is a tedious and frustrating task which often leads to the application of undue force. The joints are often damaged as a result and there is a significant on-going cost in repairing the mannequins or forms. There is no such need to align hidden parts when a joint embodying the invention is dissembled. Consequently, there is much less likelihood of damage and the number of repair bills is expected to be significantly reduced. Further if a mannequin or form having a protruding limb were dropped, a traditional joint would likely lead to damage of the mannequin or form, or to personnel. Using a joint embodying the invention, however, the limb would more likely drop off than be damaged or cause damage.

There may be an unexpected advantage if the joint is at, say, a knee or elbow of a limb which is bent at a large angle, since it may be possible to assemble the joint back to front with the limb more or less straight for transport. Of course, the lower part of the limb would be the wrong way round but its appearance would not matter for transport, and there would be a considerable saving in space.

In a preferred embodiment of this aspect of the invention, the magnetic material in the surface of one part is in the form of a ferro-magnetic plate, and the magnetic material in the surface of the other part comprises the ends of two pole pieces coupled to respective poles of a permanent magnetic.

The preferred arrangement enables a surprisingly small permanent magnet to generate sufficient magnetic attraction for the joint to be robust and for there to be room to contain the permanent magnet in one part of a joint at, say, a knee, in places not usually possible with a traditional LT fitting. Indeed in one form the permanent magnet is a ferrite block which is 25 mm in the direction of magnetism and the pole pieces are each 3/16 inch thick bright mild steel on which there are a plurality of spots of weld to key to the respective part of the mannequin or form.

In the preferred arrangement, the pole pieces are preferably glued to the poles of the permanent magnet.

It is found convenient in the preferred embodiment to make the plate and the ends of the pole-pieces flat.

The male member and socket are preferably tapered. Held together by magnetic force, the taper increases the frictional forces between the two parts of the joint, so reducing the magnetic force, and thus the size of the magnet, which is necessary to hold the joint together.

In one convenient form, the male member and the socket are generally oval.

Another problem with the conventional joints is that the joint between the two parts is unsightly and often spoils the display when it can be seen, for example because it is not covered by the clothes or can be seen through the material of the clothes as in the case of tights. In the conventional arrangement because the parts have to be rotated relative to one another to lock the bayonet fitting together, the surfaces between the joint are usually flat and the visible line between the two parts lies on a flat plane ie appears straight.

Surprisingly, it has been found that if the joint-surfaces lie on a non-flat plane at their peripheries, the line which is visible between the two parts (ie at the periphery) can be given a much more pleasing appearance.

One useful contour is for the peripheral joint surfaces to each lie on two generally flat mutually intersecting planes.

Another surprising effect of the joint surfaces lying on a non-flat plane at their peripheries, is that it assists significantly in locating the two parts during assembly, in particular blind, for example, when the joint is covered by clothing.

The joint allows extreme positions to be adopted and yet assemble conveniently. This aspect of the invention thus extends to a mannequin or form in which the joint is at or about an elbow or knee in a limb which is bent significantly at the knee or elbow.

Joints clearly have uses in applications other than mannequins or forms, and in accordance with another more general aspect of the invention there is provided a joint for connecting two parts together, said joint comprising: a joint-surface on each part, at least part of which joint-surfaces engage each other when the joint is assembled, magnetic material being contained in or behind both of the joint-surfaces, the magnetic material in at least one of the parts comprising, or being magnetised by, a permanent magnet sufficient to hold the joint together in use, the joint surfaces being contoured to interfit so as to define one or more relative positions in which the parts can be located when the joint is assembled and from which the parts cannot be moved without dissembling the joint at least partly.

One embodiment of the invention will now be described, by way of example, with reference to the accompanying drawings, in which.

Figure 1:
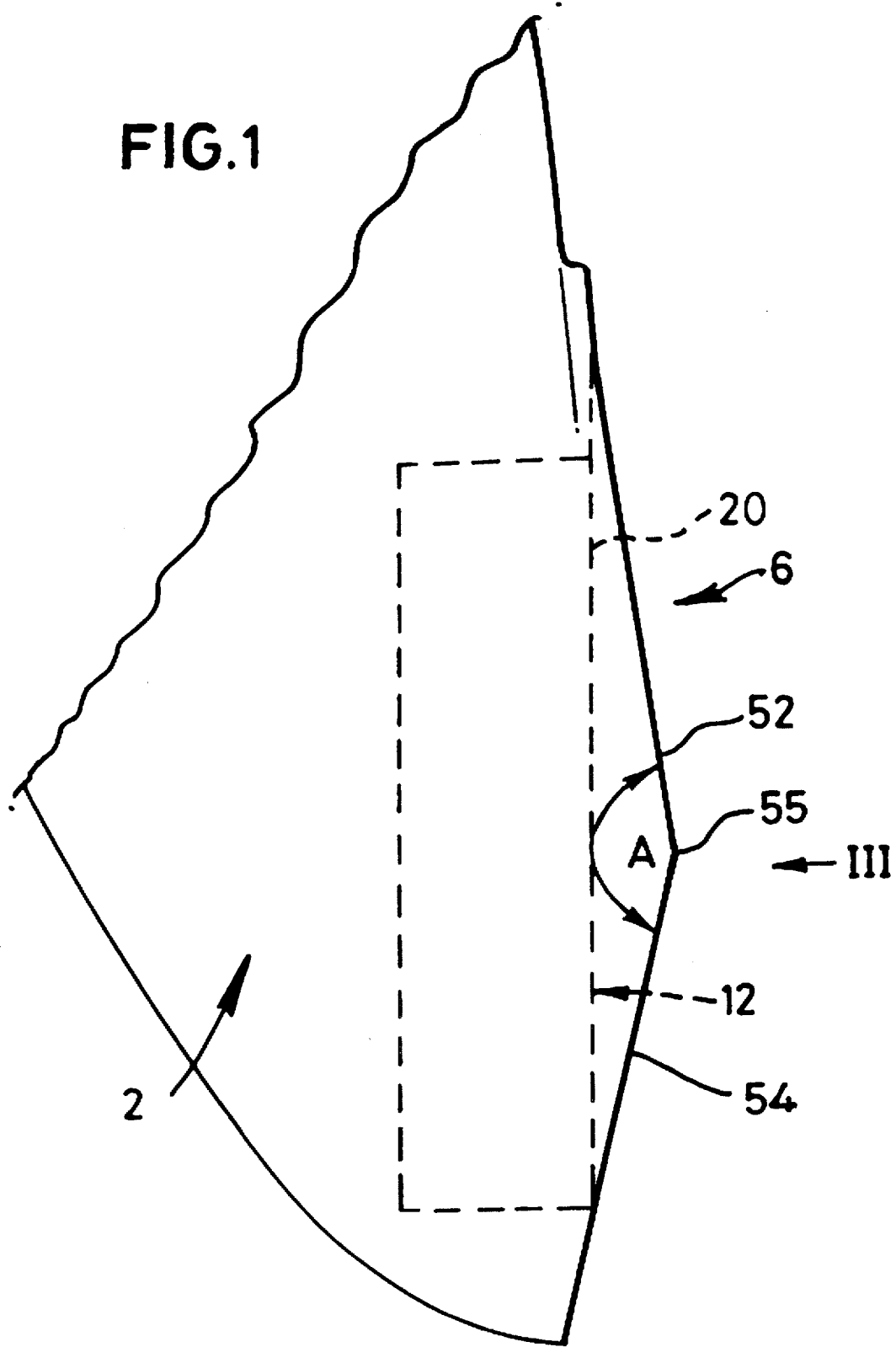
FIG. 1 is a side view of the upper part of a knee joint of a mannequin or form embodying the invention.

As is conventional, the mannequin or form of which the knee joint is illustrated in the drawings is made of glass reinforced resin which is laid up in moulds in accordance with well known and established methods.

The mannequin or form is desired to have one knee bent so that the lower leg makes an acute angle with the upper leg thus making it impossible to dress the mannequin or form in, say, trousers or tights without removing the lower part of one of the legs, in this case the bent one.

Figure 2:
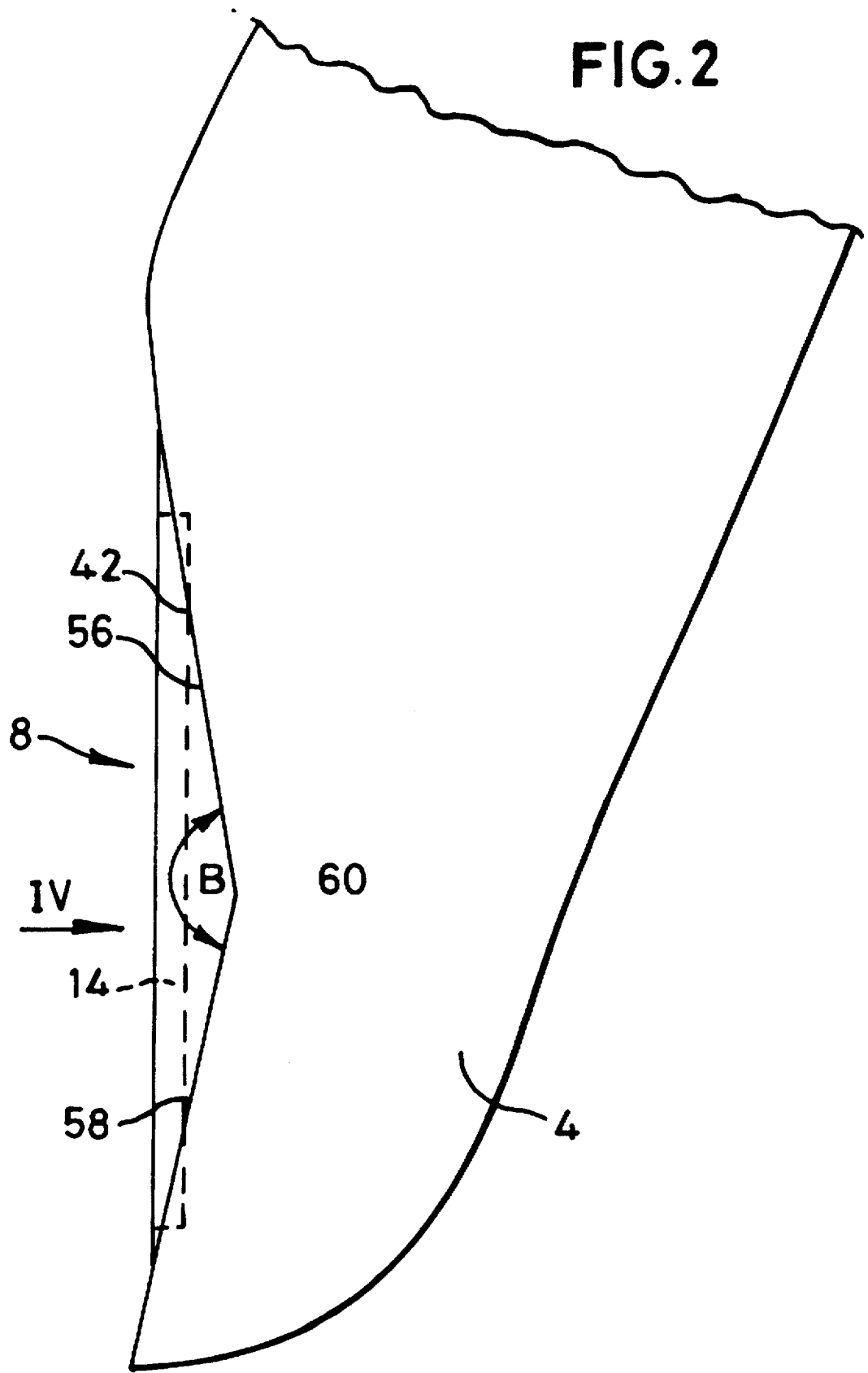
FIG. 2 is a side view of the lower part of the knee joint of FIG. 1.

The upper leg 2 and the lower leg 4 are therefore separable the parts being shown in FIGS. 1 and 2 respectively. The two parts 2 and 4 each have joint-surfaces 6 and 8 which engage each other and mate together when the joint is assembled.

Figure 7:
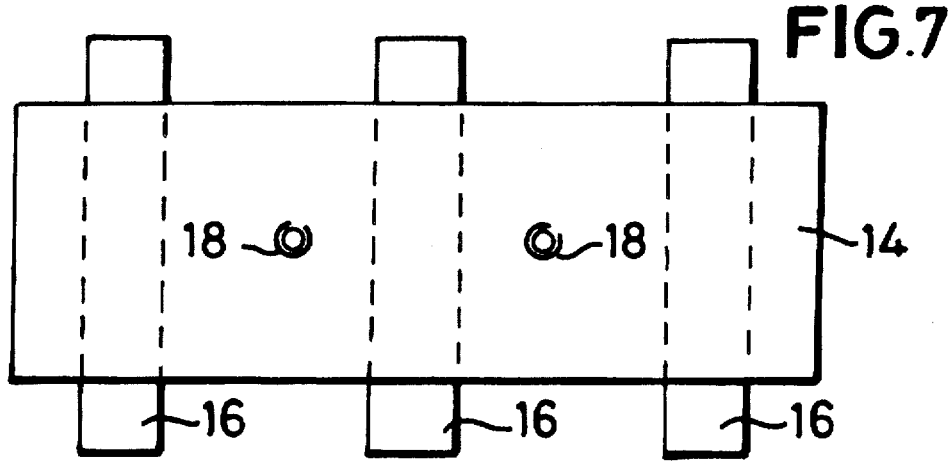
FIGS. 7 and 8 show the counterplate of the lower part of the joint in plan and end elevation respectively.
Figure 8:
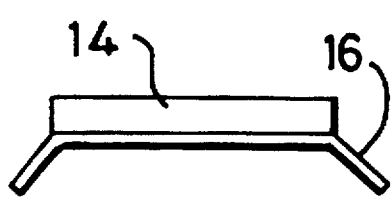

The joint-surface 8 of the lower leg 4 has a flat portion 10 corresponding with a generally flat portion 12 of the joint-surface 6 of the upper leg 2. A ferromagnetic counterplate 14 is let into the portion 8, more or less flush. This is achieved by first locating the plate in the mould, and then laying up glass fibre and resin around the plate which, as may be seen in FIGS. 7 and 8, has two or three cross-members 16 (three are illustrated, but none or one or two may be sufficient) welded to its rear face to improve the bond to the lay up. The cross members 16 are angled away from the front of the plate at their ends to enable the glass fibre reinforcement to be laid underneath. Two threaded holes 18 may be used to locate the plate accurately in the mould by screws through matching holes in the mould. Alternatively, the counterplate may be located in the mould by a magnet, not illustrated. For this purpose, the mould is formed with a shallow recess to accurately locate the counterplate, the plate being held in the recess by a magnet located in or behind the surface of the mould.

Figure 9:
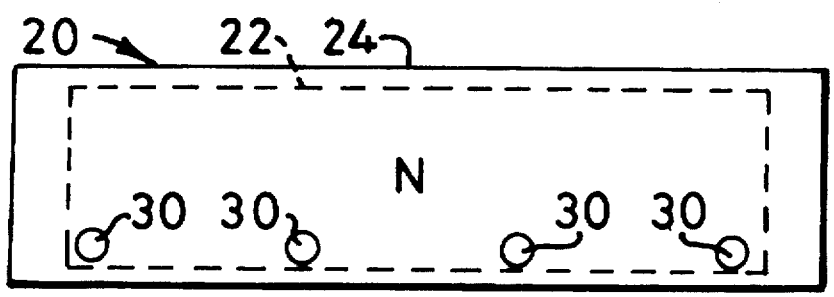
FIGS. 9 and 10 show the magnetic assembly of the upper part of the joint in elevation and plan respectively.
Figure 10:
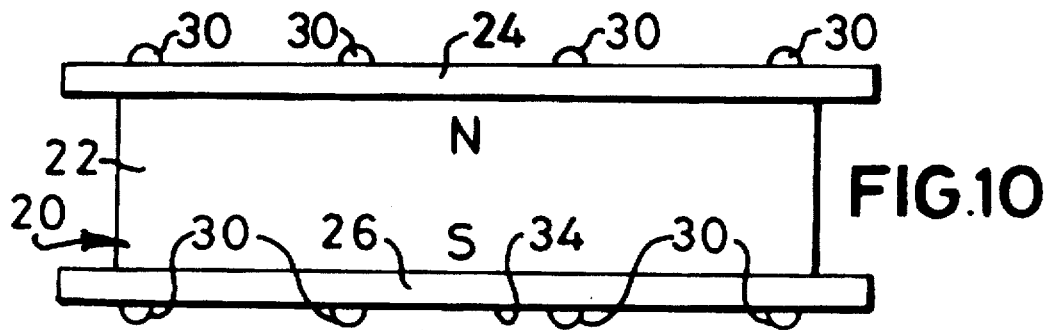

Similarly let into the joint-surface 6 of the upper leg is a magnetic assembly 20 illustrated in detail in FIGS. 9 and 10. A ferrite block magnet 22 has poles indicated by N and S on opposed long sides of the block. The ferrite block is made from a ferrite material called Ferrimag 8A available from Cruciple Materials Corporation, Elizabethtown, Ky., USA, supplier Anchor Magnets, Bankside Works, Darnall Road, Darnall, Sheffield S9 5A11. Two bright mild steel pole pieces 24 and 26 are assembled one on each pole and are secured by suitable means. We prefer to use a glue e.g. Agomet F300 available from Agomet Klebstoffe GmbH, Postfach 13 45, D-6450 Hanau, Germany. One component of the glue, a hardening liquid lacquer, is applied with a brush to the ferrite magnet and the other component of the glue, a paste, is dabbed or pasted onto the bright mild steel pole pieces. The pole pieces are then assembled on the magnet and, if necessary, clamped for a minute or two while the glue sets. The ferrite may be magnetised before or after the pole pieces have been glued on. Before assembling the pole pieces with the ferrite block, spots of weld 30 are spaced along one side to provide a key for the glass reinforced plastics to be layed up round the assembly.

Figure 11:
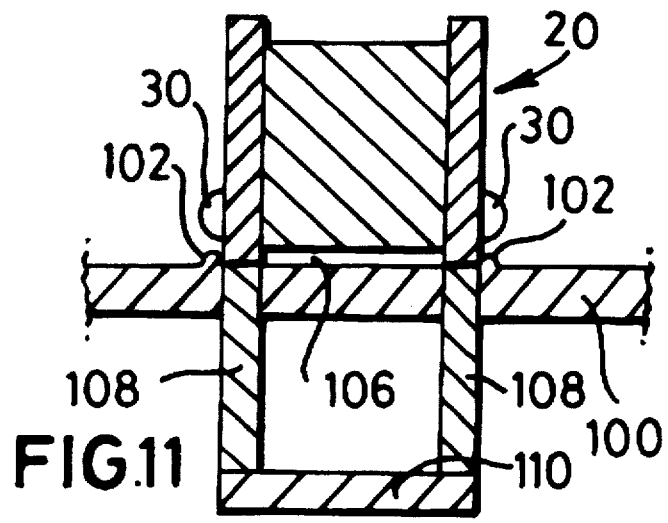
FIG. 11 is a cross section through a part of a mould.

The magnetic assembly 20 is first located in the mould with the long edges 32 and 34 on one side of each of the pole pieces 24 and 26 against the surface of the mould which corresponds to the flat portion 12 of the joint-surface 6. The magnetic assembly may be located accurately by suitable ferromagnetic material in or behind the surface of the mould. The mould 100 (see FIG. 11) is formed with short small ridges 102 around the position for the magnetic assembly. These define a recess 106 to receive the magnetic assembly 20. In the finished moulding the magnetic assembly has shallow channels round parts of its periphery corresponding to the ridges 102 in the mould.

The attractive force of the magnetic assembly for the ferromagnetic material in or behind the surface of the mould could be large enough to break the magnet out of the moulding as it is removed from the mould, if the moulding material, e.g. glass reinforced plastics, has not completely cured. In order to allow the moulding to be removed from the mould earlier, when only partly cured, the ferromagnetic material is in the form of two rails 108 of ferromagnetic material extending through the mould 100 from the recess 106 so that they are exposed outside the mould. The rails may be made of 3/16 bright steel bar. The magnetic assembly 20 is located in the recess 106 against the rails. The attraction between the rails and the magnetic assembly is not great and, indeed is insufficient to hold the magnetic assembly sufficiently firmly during the moulding process. A bridge 110 of ferromagnetic material, e.g. bright steel bar, is placed across the rails 108 outside the mould so completing a magnetic circuit between the poles of the magnet and thus increasing the force holding the magnetic assembly against the rails. After moulding, the bridge 110 is removed from the rails 108 to facilitate removal of the moulding.

Figure 5:
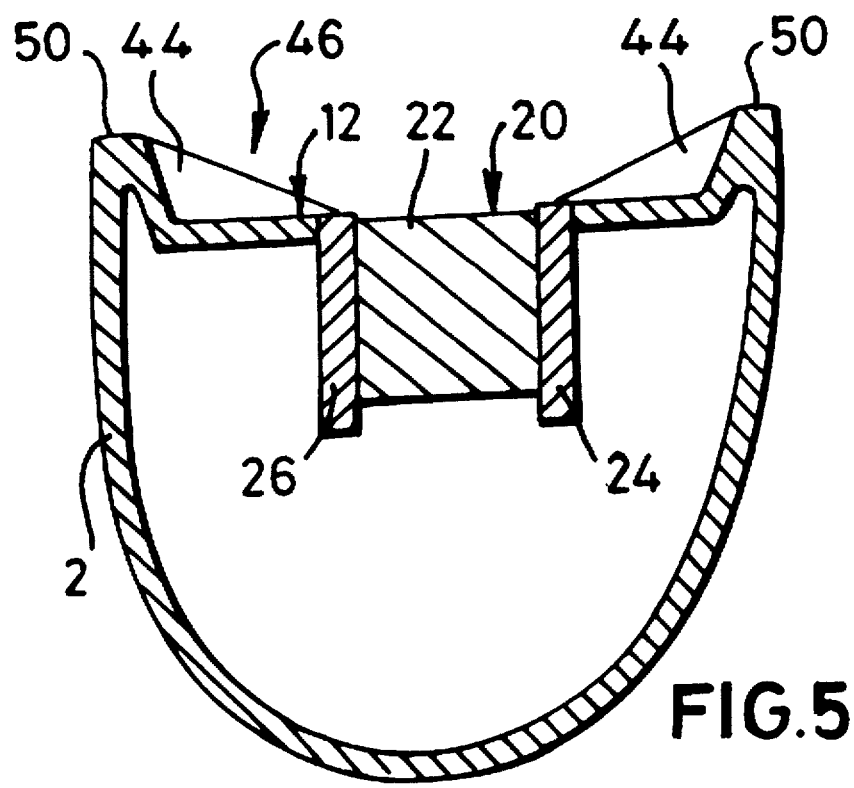
FIG. 5 is a section on arrows V—V of FIG. 3.

The glass reinforced plastic is layed up around the magnet so bonding it into the structure of the joint, see FIG. 5.

In other examples, laying up glass reinforced plastics is replaced by rotary casting polyurethane in a semi-automatic process.

In order to prevent rust, the counterplate and/or the pole pieces may be coated, for example plated.

For optimum utilisation of the available magnetic forces, it is important that the pole pieces and the counterplate 14 are thick enough that there is no great leakage of magnetic flux. Optimally there would be none. That is to say the great majority of the magnetic flux should be contained by the magnetic circuit comprising the two pole pieces, the counterplate and the block magnet when the joint is assembled. As a practical test, a piece of soft iron should undergo no great attraction for any part of the magnetic assembly when the counterplate is in place, if the pole pieces and the counterplate are thick enough to contain the majority of the flux without undue leakage.

Figure 4:
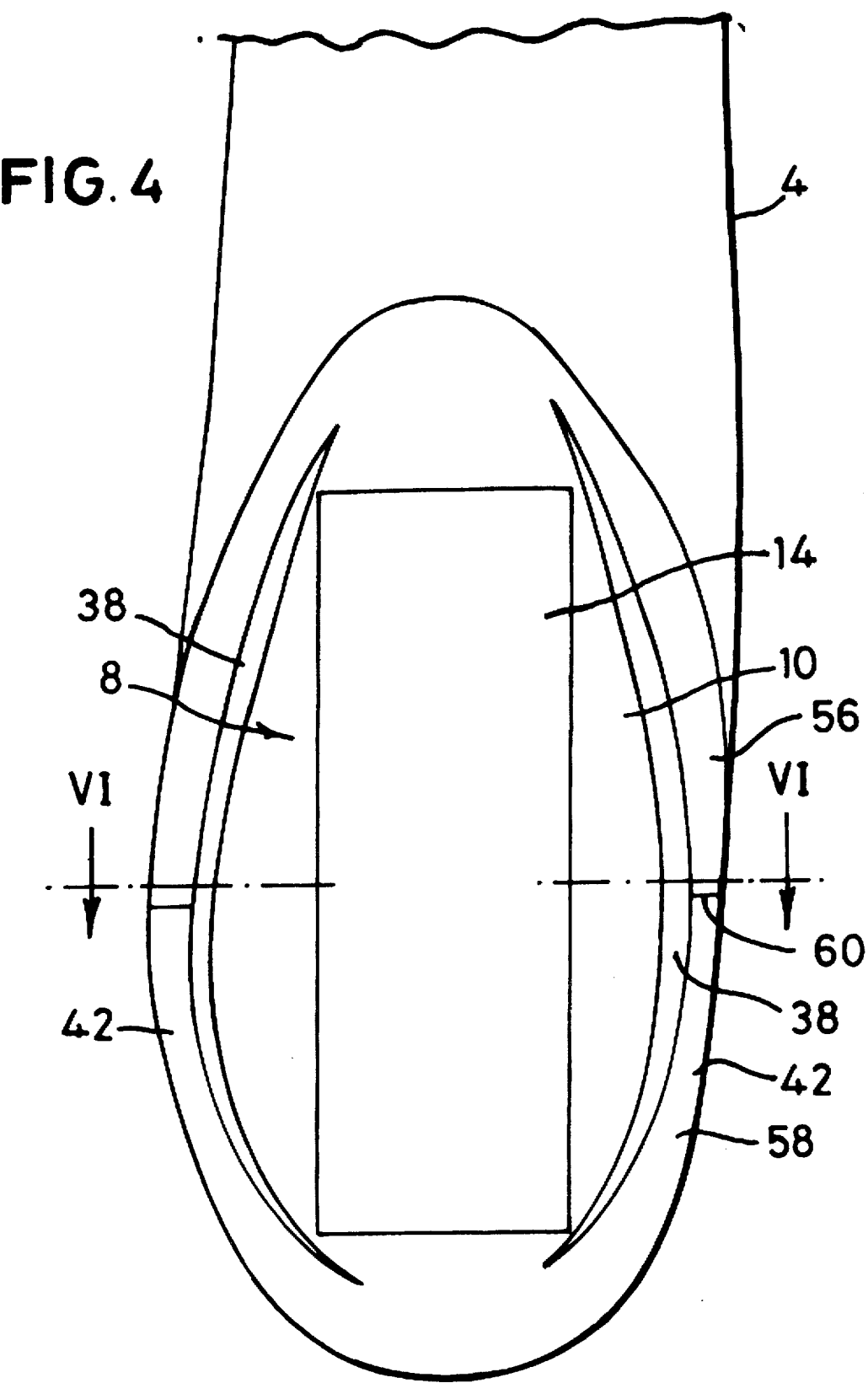
FIG. 4 is a view on arrow IV in FIG. 2.
Figure 6:
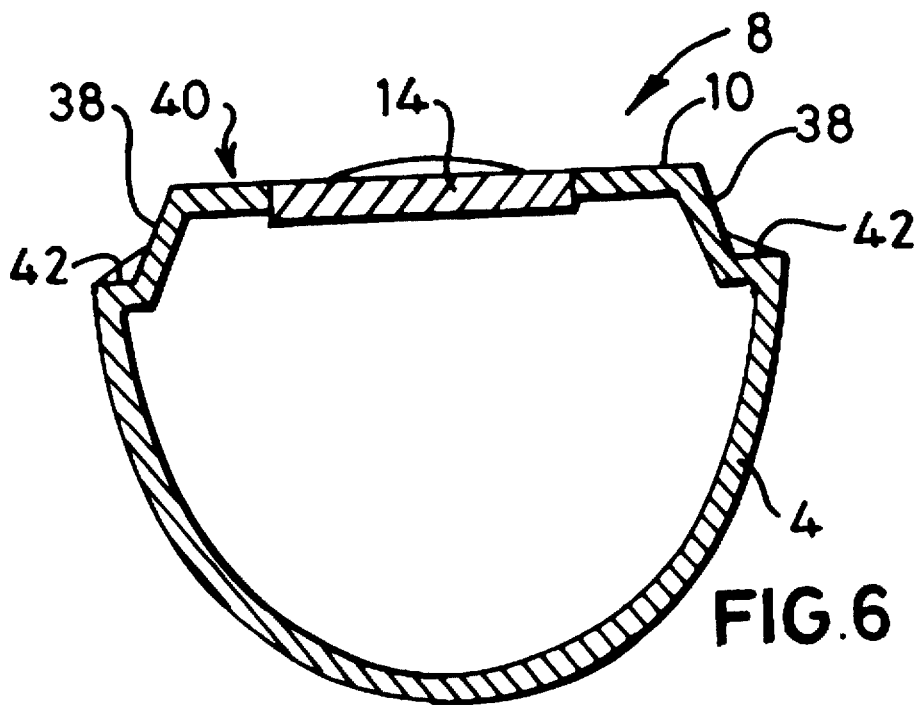
FIG. 6 is a section on arrows VI—VI of FIG. 4.

The flat portion 10 of the joint-surface 8 of the lower part of the knee joint is a generally oval shaped, see FIG. 4. Surrounding the flat portion 10 is a tapered portion 38 which, with the flat portion, forms a male member 40 upstanding from the surrounding peripheral portion 42 (see FIG. 6).

The flat portion 12 and a surrounding tapered surface 44 together form a socket 46 in the joint-surface 6 of the upper part of the knee joint (see FIG. 5) to receive the male member 40 on the lower part of the joint. The male member and socket surfaces fit together accurately to locate the lower part of the joint on the upper part. The flat surfaces 10 and 12 or the male member and the socket preferably do not quite meet, e.g. being spaced by 0.5 mm, so that there certainty that the tapered surfaces 38 and 44 are pulled into frictional engagement by the forces between the magnetic assembly 20 and the counter plate 14 and that no gap is left between the peripheral portions of the joint surfaces when it is assembled. The frictional forces assist the magnet to hold the joint together so reducing the magnetic force, and thus the size of the magnet, which is necessary. In the knee joint illustrated, I have found that best results are obtained if the tapered surfaces 38 and 44 are at an angle of 73 to 74 degrees to their respective flat portions 10 and 12. More generally, the tapered surfaces 38 and 44 are preferably at an angle of from 65 to 75 degrees to their respective flat portions 10 and 12. Even more generally, the tapered surfaces 38 and 44 are preferably at an angle of 45 to 90 degrees to their respective flat portions 10 and 12. In some arrangements, the surfaces 10 an 12 may not be flat. The angles given above imply an angle included by the surfaces 38 and 44 of 32 to 34 degrees, or more generally 30 to 50 degrees or even more generally less than 90 degrees.

The generally oval shape of the male member and socket illustrated (see FIGS. 3 and 4) is asymmetric and ensures that the joint can only be assembled in one orientation. In another example, not illustrated, the oval is symmetrical so that the joint can be assembled with the two parts in two alternative orientations relative to one another. One position is the normal position in which it would be displayed. To make the form more convenient to transport, when its appearance is not important, the lower part of the leg may be assembled back to front, and thus generally in line with the upper part.

Further precision and convenience in the alignment of the two parts is provided by the shape of the peripheral portion 42 surrounding the male member 40 of the joint-surface 8, and a peripheral portion 50 surrounding the socket 46 of the joint-surface 6. The peripheral surface 50 illustrated, which is generally convex, includes two flat portions 52 and 54 inclined to one another at an angle A (see FIG. 1) and meeting at an apex 55. The peripheral surface 42 illustrated, which is generally concave, has two flat portions 56 and 58 inclined at an angle B and meeting at 60. The angles A and B are equal so that the peripheral surfaces 42 and 50 engage one another when the joint is assembled so assisting in the location of the lower part of the joint on the upper part. If the lower part of the joint is offered to the upper part out of alignment, first the peripheral surfaces 42 and 50 engage each other. Their shape assists the parts to be moved towards their aligned position, even when the joint is out of sight, e.g hidden by clothing in, say a trouser leg. As alignment is approached, the narrow end of the tapered male member 40 finds the wider opening of the socket 46 and the magnetic force between the magnetic assembly 20 and the counter plate 14 draws the male member into the socket.

The non-flat peripheral surfaces 42 and 50 can be shaped to provide a line at the joint which appears much more pleasing than the straight line which is obtained of necessity in the conventional joint using and LT fitting. Surprisingly, a line which is pleasing aesthetically, is also found to give a shape to the surfaces 42 and 50 which is very effective to assist in the location of the two parts as described above.

In the knee joint illustrated, the angles A and B are both 155 to 160 degrees. In a shoulder joint, not illustrated, I have found that 146 to 148 degrees is suitable for the equivalent angles to angles A and B. In this case the angle between the equivalent of tapered surfaces 38 and 44 and their respective flat portions, equivalent to portions 10 and 12 illustrated, is preferably 68 to 71 degrees. In a waist joint, not illustrated, the peripheral surfaces were continuously curved with a dip below the navel and the angle between the equivalent of tapered surfaces 38 and 44 and their equivalent of respective flat portions 10 and 12 is preferably 72 degrees. In a neck joint, not illustrated, the peripheral surface was flat and the angle between the equivalent of tapered surfaces 38 and 44 and their equivalent of respective flat portions 10 and 12 is preferably again 72 degrees.

Figure 3:
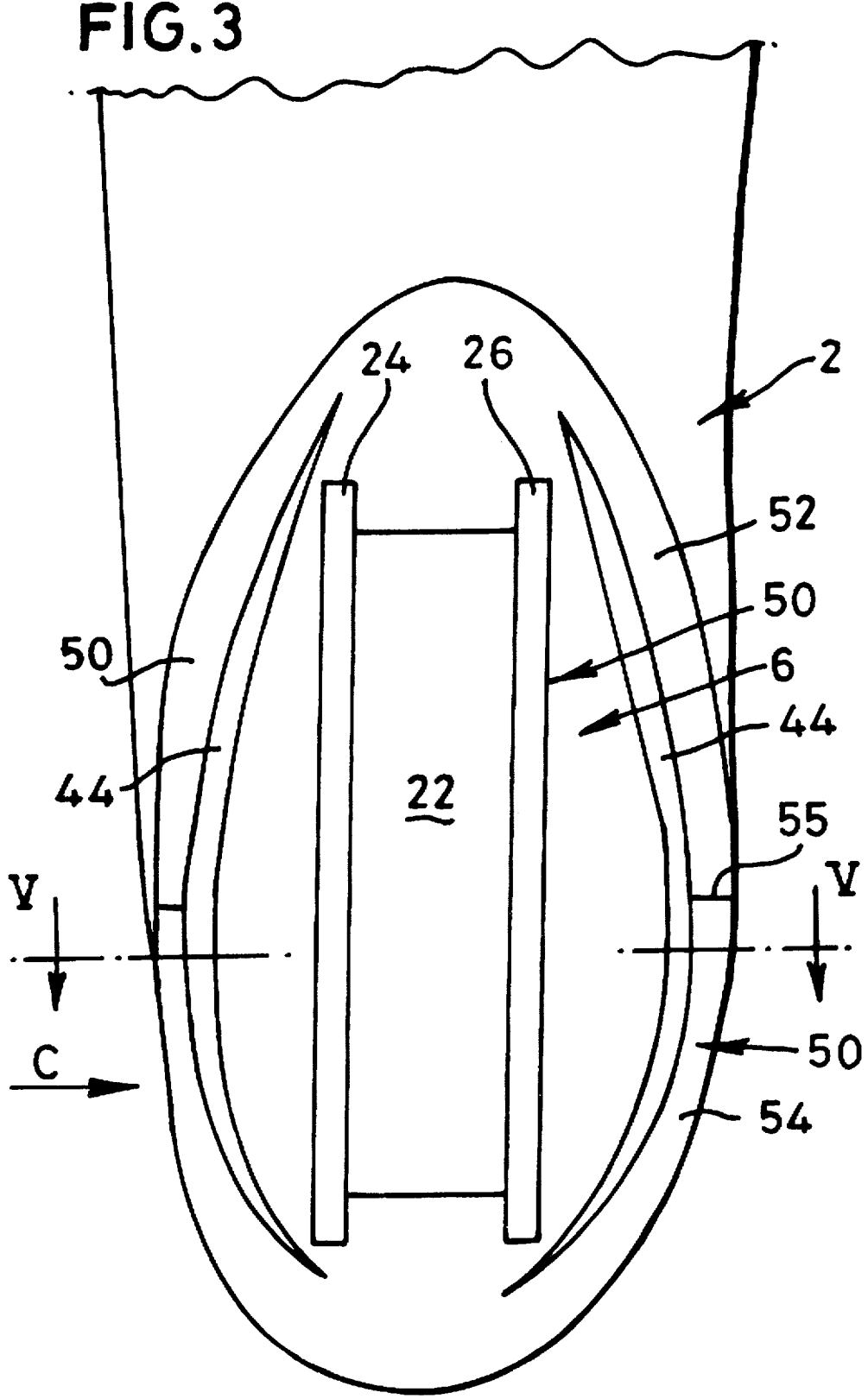
FIG. 3 is a view on arrow III in FIG. 1.

The oval male member 40 and socket 46 arrangement contributes to alignment of the joint largely in a rotational direction and in a horizontal direction as seen in FIG. 3, while the interengagement of the convex peripheral surface 50 with the concave surface 42 contributes to alignment of the two parts largely in the vertical direction as seen in FIG. 3.

An effect of the concave surface 42 and convex surface 50 is that the line they create in the surface of the joint when assembled is not straight. Surprisingly, it is found that the appearance of the line is much more attractive than the straight line which is necessary in prior art mannequins and forms because of the type of joint used. Because the parts of the joint do not have to be rotated relative to one another after they have been brought together, the chances of damaging even a delicate material caught between the two, are reduced. Indeed, if, say, tights become trapped in the joint, it reduces unsightly bagginess at the joint which would otherwise need carefully easing out by the dresser.

Since the relative positions of the two parts of the joint are determined by the shapes of the moulded joint surfaces, the location of the magnetic assembly and the counterplate are not all that critical. There can thus be large tolerances in their positions, so long as they are positioned accurately enough to hold the joint together. In contrast, with the traditional LT fitting, the accuracy of the positions of the T-shaped projection in one member and of the socket in the other, determined how accurately the two plastic members aligned.

In other arrangements, not illustrated, the joint may be assembled with the two parts in more than one alternative relative orientation. Thus for a shoulder joint between the arm of a mannequin or form it may be advantageous to be able to fit the arm on in a number of different positions relative to the torso. Because of the weight of the arm itself and any clothes it is dressed in or accessories or other articles it may be wearing, the magnetic attraction between the two parts of the joint is insufficient to hold the arm reliably in any orientation except hanging more or less straight down. To allow the arm to be positioned at other angles, the male member and the socket are shaped to interfit so as to define one or more relative positions in which the parts can be located when the joint is assembled and from which the parts cannot be moved without dissembling the joint at least partly. For example, the male member may be triangular, or square, or some other regular polygonal or multi sided shape, or may be formed with teeth or other projections or notches, and in each case the socket is formed to interfit with the male member so that once assembled the arm cannot be rotated relative to the torso. A number of different orientations are defined, however, in which the two parts may be assembled.

Although magnetic joints have been proposed for toy figures or dolls, it is entirely surprising that a magnet can be located in the joint of a mannequin or form and have sufficient strength to locate the two parts of the joint accurately in use, especially when supporting the clothing, accessories, and/or other articles to be displayed. In the knee joint illustrated in the drawings a ferrite block magnet 100 mm by 25 mm by 25 mm was found entirely sufficient. The counterplate and pole pieces are all 3/16" thick bright steel bar. The pole pieces stand 2 mm proud of the magnet.

In other arrangements, the mannequin or form may be manufactured in other plastics materials which are not reinforced.

I claim:

1. A mannequin form for displaying clothing accessories comprising a replica of a human being with a limb movable about a torso, the improvement comprising:
   a joint for said movable limb comprising a magnetic material on two opposite joint surfaces for holding the joint together by means of magnetic attraction acting in a first direction,
   and mating interfit joint surfaces having means other than friction for preventing movement of said limb relative to said torso in a direction perpendicular to said first direction for allowing said limb to be placed in different relative positions solely in reliance upon said magnetic attraction for holding the joint together in said first direction.

2. A form according to claim 1 wherein said joint is enclosed by a joint edge defined by oppositely disposed peripheral edges of said joint-surfaces, said joint edge being non-linear when viewed in directions perpendicular to said one direction.

3. A mannequin form for displaying clothes accessories or other articles, comprising at least two parts which are separable at a joint to allow the form to be dressed, the joint comprising a joint-surface on each part, at least parts of which joint-surfaces engage each other when the joint is assembled, magnetic material being contained in or behind both of the joint-surfaces, the magnetic material in at least one of the parts comprising, or being magnetized by, a permanent magnet sufficient to hold the joint together in use, the improvement comprising:
   the joint-surfaces are shaped to interfit so as to define one or more relative positions in which the parts can be located when the joint is assembled and from which, by means other than friction, the parts cannot be rotated in first directions without at least first partly disassembling the joint by relative movement of the parts in a second direction different from said first directions.

4. A form as claimed in claim 3, wherein the magnetic material in the surface of one part is in the form of a ferro-magnetic plate, and wherein the magnetic material in the surface of the other part comprises the ends of two pole pieces coupled to respective poles of a permanent magnet.

5. A form as claimed in claim 4 wherein the pole pieces are glued to the poles of the magnet.

6. A form as claimed in claim 4 wherein the plate and the ends of the pole-pieces are flat.

7. A form as claimed in claim 4, wherein the permanent magnet is a one inch ferrite block and the pole pieces are each 3/16 inch thick bright mild steel on which there are a plurality of spots of weld to key to the respective part of the form.

8. A form as claimed in claim 7, wherein the joint-surfaces include a male member on and extending in a third direction from one of said parts and a socket for mating with said male member on and extending in a fourth direction inwardly of the other of said parts, said third and fourth directions generally coinciding when said joint is assembled, and the interfit between said male member and said socket preventing relative rotation of said parts around said coincident directions.

9. A form as claimed in claim 8, wherein the male member and the socket are tapered.

10. A form as claimed in claim 9, wherein the angle included by the taper is up to 90°.

11. A form as claimed in claim 10, wherein the angle included by the taper is 30° to 50°.

12. A form as claimed in claim 9, wherein the male member and the socket are generally oval.

13. A form as claimed in claim 8, wherein the joint-surfaces have respective peripheral portions which are generally aligned with one-another in parallel, facing relationship when the joint is in assembled condition to form a continuous, peripheral joint edge, said joint edge forming a non-straight line when viewed in directions perpendicular to said coincident directions.

14. A form as claimed in claim 3 wherein each joint-surface adjoins, at its periphery, a side surface of the part on which it is disposed, said side surfaces of both said parts forming, when said joint is in assembled condition, a generally continuous form surface joined together at a joint edge, and each said joint-surface includes a generally flat portion disposed along the periphery thereof, said flat portions of said joint-surfaces being disposed, when said joint is assembled, in overlapping, parallel relationship.

15. A form as claimed in claim 3, wherein the joint is at or about an elbow or knee joint of the form, in a limb which is bent significantly at the knee or elbow.

16. A form as claimed in claim 3, wherein said joint-surfaces are contoured in a mating relief pattern of surface elevations on one of said surfaces and corresponding depressions on the other of said surfaces for preventing said relative first directions rotation.

17. A form as claimed in claim 3 wherein said interfit is such that said parts cannot be rotated relative to one another without disengaging said joint-surfaces.

18. A form as claimed in claim 17 wherein said joint-surfaces include complementary shaped male and female components fitting one within the other when said joint-surfaces engage each other for preventing relative rotation of said parts.

19. A form as claimed in claim 18 wherein one of said parts is a life-sized replica of the torso of an adult human being, and the other of said parts is a limb joined to said torso.

* * * * *